Patented Sept. 27, 1949

2,483,287

UNITED STATES PATENT OFFICE 2,483,287

METHOD OF PURIFYING MANGANESE ELECTROLYTES

John Koster, Crimora, Va., assignor to Crimora Research & Development Corporation, Crimora, Va., a corporation of Virginia No Drawing. Application June 23, 1945, Serial No. 601,325

1 Claim. (Cl. 23—117)

This invention relates to the purification of manganese electrolytes. It has for its object the economical and rapid removal of metallic impurities. More specifically, it relates to certain improvements in the process covered by U. S. Patent No. 2,347,451 to Ambrose. Other aims and advantages of the invention will appear in the following specification and in the appended claim.

In the known art, the removal of impurities, as sulphides, has been accomplished by the addition of highly adsorptive materials, such as activated charcoal, added either before or after the separation of most of the precipitated sulphides from the solution. When added before the separation of the sulphides from the solution, it increases the consumption of sulphide ion necessary to precipitate the metal impurities. When added after the separation of the sulphides from the solution, it has been found to be less effective. The most effective material, when added in this way, has been found to be freshly precipitated iron hydroxide. The ferroxy hydrosols, formed in this way, have long been known to be extremely effective adsorbents. They have been used for the removal of arsenic and other constituents from manganese and zinc electrolytes. Their use, however, is expensive and time consuming. They are relatively unstable, particularly in the presence of ammonium sulphate, and must, therefore, be formed in the solution by adding ferrous salts and oxidizing these ferrous salts with air. This oxidation requires time and a further period of time is necessary to insure adsorption of the impurities by the precipitated ferric hydroxide.

The present invention provides an expeditious method of purification of manganese electrolytes utilizing a stabilized hydrosol of positively charged particles of clay or kaolin. A convenient form of stabilized hydrosols having positively charged particles is a clay suspension activated with aluminum hydroxide gel. Such suspensions are in common use for medical purposes and are ideal for the purposes of the present invention. An example is known as "Kaomagma," which consists of kaolin, activated with alumina gel. It is not, of course, necessary to insure the degree of purity which is essential for medical use. Iron and chromium hydroxides may also be used to activate and stabilize clay suspensions for the purpose of the present invention. Other stabilizing media than clay may also be used. In general, the stability of such positively charged hydrosols will be sufficient to insure removal of the colloidal sulphides and sulphur, as well as any organic material, from the solution, but will not be so great as to prevent the filtration of the solution at a reasonable rate. The agglomeration of the positively charged hydrosol may, however, be accelerated by increasing the pH of the solution. The pH, of course, cannot be increased to a point where manganese is precipitated. Hydroxyl ions are effective precipitants of aluminoxy and ferroxy hydrosols.

Organic compounds with large negative ions, such as the sulphate wetting agents, are also effective in increasing the filtering rate of solutions purified in accordance with this invention. Ordinary filter aids such as activated charcoal may also be used to improve the filtering properties of the solution. By the use of this invention, the same degree of purification can be obtained as with the precipitation in the solution of ferric hydroxide by the oxidation of ferrous salts. There is, however, a considerable saving in time, since the adsorptive surface is already formed when added, and is extremely and uniformly active. If the solution to be purified, is stirred with approximately 0.5 gram of activated clay suspension per liter for about 30 minutes, it will eliminate the necessity to treat the solution with ferrous sulphate and oxidation for 30 minutes and standing for a considerable period. The pH of the solution may be as low as 5. The adsorption of impurities at this pH is quite rapid and the stability of the positively charged hydrosol is high. Increasing the pH to 7.5 will greatly increase the filtering rate and will not precipitate manganese. Since no aeration is necessary, there is no danger of oxidation and loss of manganese due to this cause.

It is contemplated that the activated clay suspension will be effective in removing practically all of the colloidal sulphur and the sulphides of the heavy metal impurities present in the solution. In some instances, it will not be necessary to use any activated charcoal.

It will be understood that the foregoing description is merely illustrative of the invention and it is not to be construed as limiting it, except as defined in the appended claim.

What is claimed is:

In the purification of manganese ammonium sulphate solutions for electrolysis which includes the steps, addition of sulphide ion to precipitate heavy metals, filtration to remove most of the impurities as precipitated sulphides, and treatment with highly adsorptive material to further purify the solution, the improvement which consists in using as the highly adsorptive material, a kaolin dispersion stabilized with a metal hydroxide, selected from the class consisting of iron, aluminum and chromium hydroxides.

JOHN KOSTER.

REFERENCES CITED

The following references are of record in the file of this patent:

UNITED STATES PATENTS

| Number | Name | Date |
| --- | --- | --- |
| 1,633,621 | Blumenfeld | June 28, 1927 |
| 2,347,451 | Ambrose | Apr. 25, 1944 |

OTHER REFERENCES

Freundlich, Colloid and Capillary Chemistry, translation from the 3rd German edition, pages 518 and 585. Published by E. P. Dutton & Co., New York.